Nov. 11, 1969  R. C. RINGHOLZ  3,477,371
VALIDATING METER APPARATUS
Filed Aug. 10, 1966  2 Sheets-Sheet 1
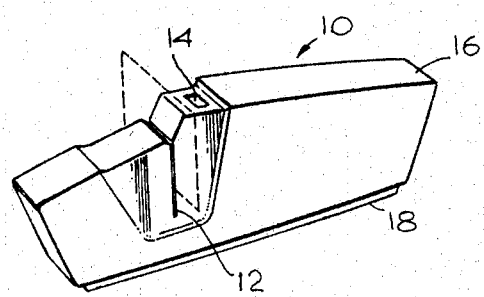
Fig. 1
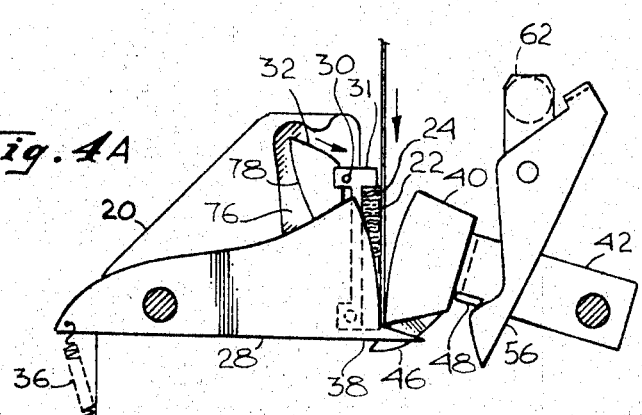
Fig. 4A
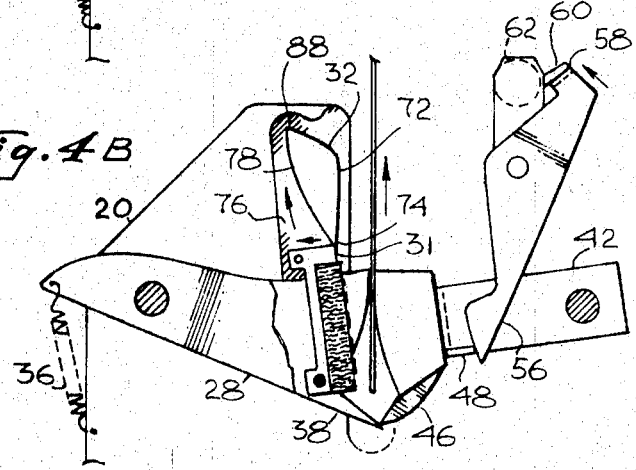
Fig. 4B
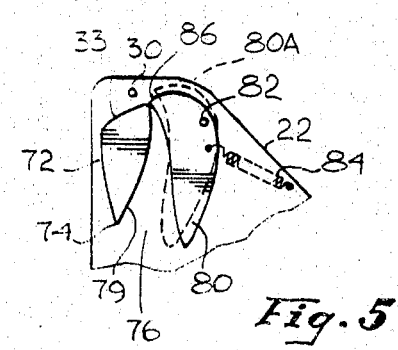
Fig. 5
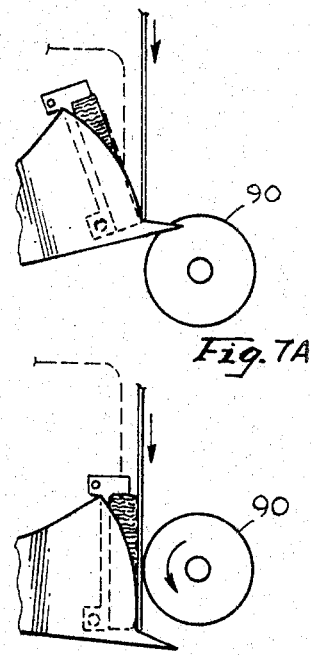
Fig. 7A
Fig. 7B
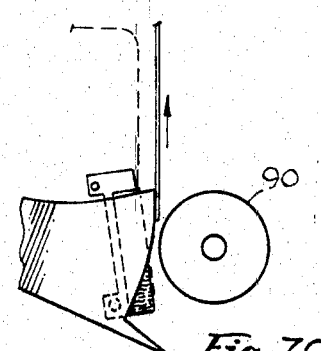
Fig. 7C
INVENTOR.
ROBERT C. RINGHOLZ
BY Samuel Lindenberg
Arthur Freilich
ATTORNEYS Nov. 11, 1969     R. C. RINGHOLZ     3,477,371
VALIDATING METER APPARATUS
Filed Aug. 10, 1966     2 Sheets-Sheet 2
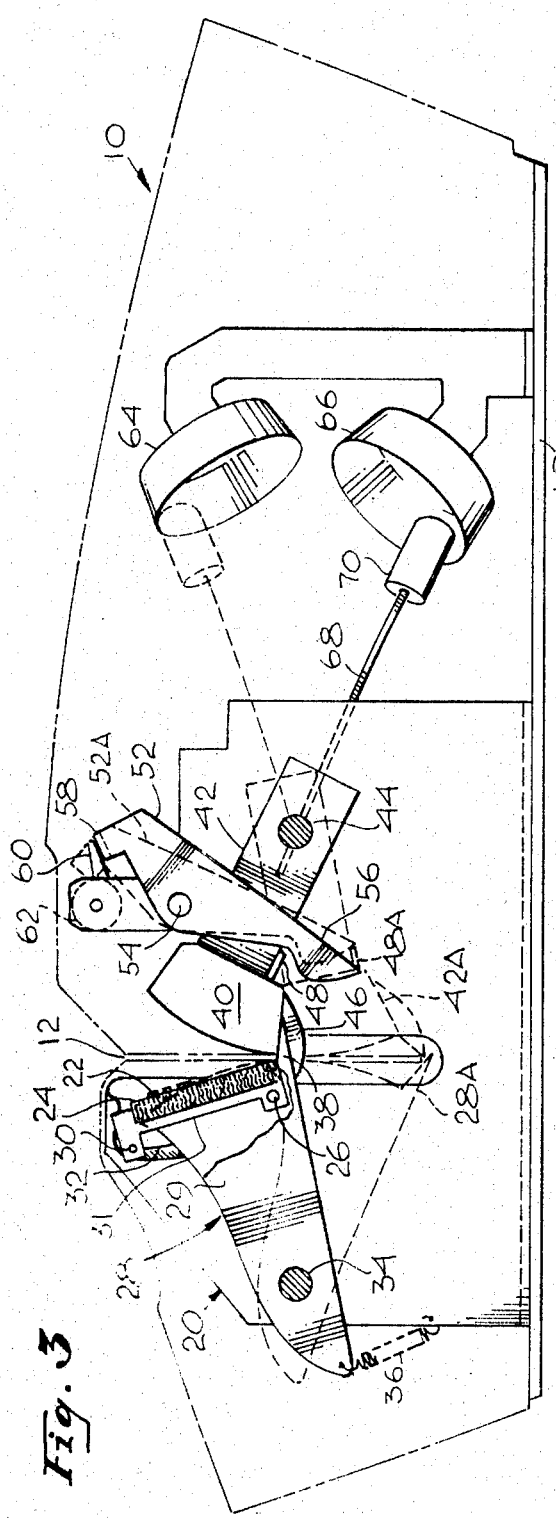
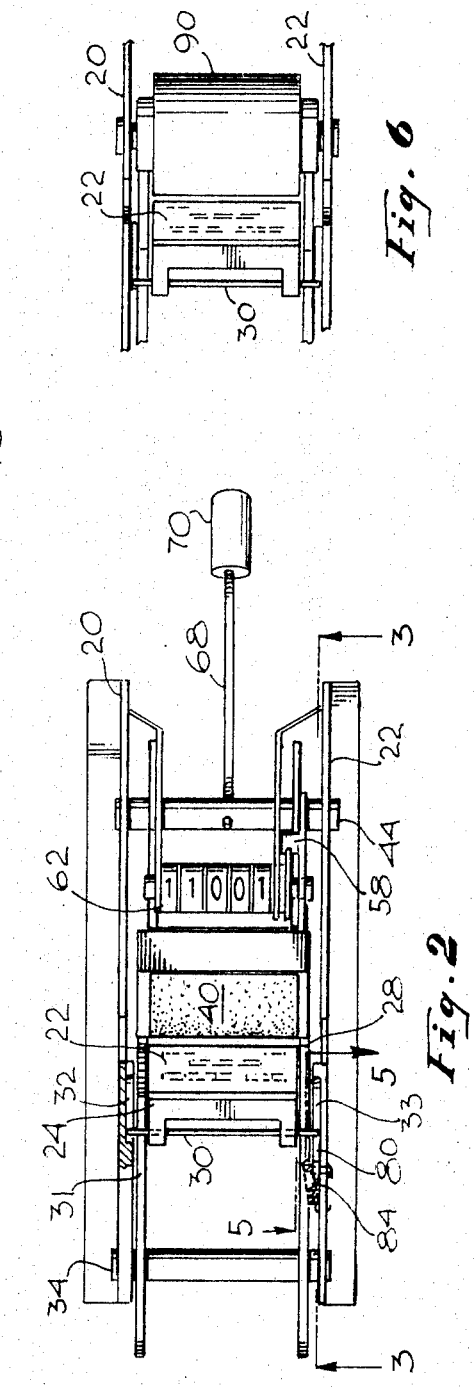
INVENTOR.
ROBERT C. RINGHOLZ
BY Samuel Lindenberg
Arthur Frelich
ATTORNEYS United States Patent Office 3,477,371
Patented Nov. 11, 1969

3,477,371
VALIDATING METER APPARATUS
Robert C. Ringholz, San Bernardino, Calif., assignor to Valometer Sales Co., San Bernardino, Calif., a partnership
Filed Aug. 10, 1966, Ser. No. 571,637
Int. Cl. B41k *1/02*
U.S. Cl. 101—283       6 Claims

ABSTRACT OF THE DISCLOSURE

A parking ticket validating machine is provided wherein the ticket is inserted into a slot in a device which includes means for printing a validating stamp on the ticket which is so inserted. Means are provided for requiring the ticket to be fully inserted into the slot before it can be withdrawn, and for retracting the printing device fully as the ticket is being withdrawn to avoid smearing. Means are also provided to audibly indicate that the validating device is being used.

---

This invention relates to apparatus for printing validations on tickets and to improvements therein.

Merchants often set up validating organizations to provide free parking for their customers. The organization makes arrangements with parking lot operators to accept stamped tickets in lieu of cash payment. Customers who park receive a ticket when they park. When the customer patronizes a merchant, the merchant stamps the ticket to validate it and thereby make it acceptable to the parking lot operator in place of a cash payment.

The parking lot operator is paid by the organization for each validated ticket he collects, and each merchant must pay the organization for each validation of a ticket made by the merchant. The validating of tickets has also been used to provide free transportation, instead of free parking, by arrangement with bus or taxi companies similar to those made with merchants.

Inasmuch as each validation costs the merchants a sum of money and each validated ticket is worth a sum of money to the parking lot operators, close controls must be maintained over the validating process to make sure that each validation is paid for and each merchant is charged only for the validations he authorizes. One of the most useful devices for facilitating validations, yet providing close control over them, is a validating machine of the type described in U.S. Patent No. 3,180,258, entitled Validating Meter Apparatus by Robert C. Ringholz, the inventor of the present invention. The machine of the foregoing patent receives tickets in a slot and imprints a validating mark on them. Each time a validating printing is made, a tape is advanced to record another validation, and a buzzer is energized to warn the merchant that the machine is being used. The number of validations which can be made is limited by the tape, which locks the machine after a predetermined number which have been paid for in advance by the merchant. Alternatively, the merchant can be allowed to pay for the number of validations registered on the machine after they have been made.

The operation of the machine described in the foregoing patent presents several shortcomings. Among them is the occurrence of blurred or double printings of the validation mark, the need for providing curved validating stamps, and the complexity of the buzzer system.

Accordingly, one object of the present invention is to provide a simple ticket validating apparatus which provides a more constantly clear imprint than has been provided by similar apparatus available heretofore.

Another object of the present invention is to provide a ticket validating apparatus of simpler construction than has been available heretofore.

Yet another object of the present invention is to provide a more efficient and reliable validating apparatus than heretofore.

The foregoing and other objects of the present invention are realized in one embodiment of the invention, by a machine having a slot for receiving a ticket. The inserted ticket lies between a printing member for making, or stamping on the validating mark, and a back-up member for supporting the ticket while it is stamped. As the ticket is pushed to the bottom of the slot, the printing and back-up members move down with it and the entire mark is imprinted. As the ticket reaches the bottom of the slot, the printing member automatically moves away from the ticket, thereby preventing a second imprint as the ticket is withdrawn and reducing the likelihood of the machine sticking or jamming.

The printing member, which stamps the ticket, carries a cam follower which is engaged with a cam on the machine housing, the cam causing the printing member to follow one path while the ticket is inserted and another path which holds it away from the ticket while the ticket is withdrawn. The path defined by the cam also allows the use of a flat printing face instead of the usual curved face, and reduces the degree to which ink is forced toward one end of the printing member by the repeated pressing of the back-up member.

Among the other features are bells and a bell striker mounted on the end of a spring which is fixed to the back-up member. When the ticket moves to the bottom of the slot and also when it is withdrawn, the bell is struck to notify the merchant that the machine is being used.

The novel features that are considered characteristic of this invention are set forth with particularity in the appended claims. The invention itself both as to its organization and method of operation as well as additional objects and advantages thereof, will best be understood from the following description when read in connection with the accompanying drawings, in which:

FIGURE 1 is an isometric view of the external appearance of an embodiment of this invention;

FIGURE 2 shows the appearance of the embodiment of the invention as seen from above with a portion of the top cover removed;

FIGURE 3 illustrates the appearance of the invention with one side of the cover thereof removed along the lines 3—3 of FIGURE 2;

FIGURES 4A and 4B show two positions which the printing portion of the validating apparatus can assume in response to the insertion therein of a card;

FIGURE 5 illustrates the appearance of the cam mechanism of the invention taken along the lines 5—5 of FIGURE 2;

FIGURE 6 is a top view of another embodiment of the invention which utilizes a roller as the back-up member; and FIGURES 7A, 7B and 7C show various positions which can be assumed by the printing portion of the imbodiment of the invention illustrated in FIGURE 6 in response to the insertion of a card therein.

FIGURE 1 illustrates the external appearance of an embodiment of the invention. This comprises a housing 10, which fits over all the mechanical apparatus of the embodiment of the invention. This housing contains a slot 12, into which the parking ticket to be validated is inserted. A counter opening 14, in the top of the housing, enables the merchant to see how many validations he has used up. A key actuated locking mechanism holds the housing cover 16 to a base 18 of the housing, to prevent unauthorized access to the mechanical apparatus.

FIGURE 3 is a side view of the invention taken along the lines 3—3 of FIGURE 2, illustrating its appearance with the stop cover portion 16 removed. The mechanism is supported between two sides plates 20 and 22 of the housing (which are shown in FIGURE 2). These two side plates are rigidly supported from the base 18.

The printing mechanism comprises a type face 22 carrying the validating mark, supported on a printer carrying member 24. The member 24 has a first side pivotally mounted as 26 on an end of a printer arm 28, and a second side including a pin 30 serving as a cam follower, engaged with a cam 32 mounted on the side plate 20 of the housing. The printer arm 28 forms a yoke with two sections 29 and 31 within which the member 24 is carried. The arm 28 is pivotally mounted on bearing 34 fixed to the side plates 20 and 22, and it holds the printer carrying member on one side of the slot 12. A spring 36 extending between the arm 28 and the housing biases the arm so that the printer carrying member is normally in an upward position. A printer arm finger 38 formed on one section 29 of the yoke defined by the printer arm, extends across the slot 12.

A printing back-up member 40 disposed on the side of the slot opposite the type face 22, is fixed to a back-up arm 42. The back-up arm is pivotally supported at 44 to the plates 20 and 22 of the housing. A back-up finger 46 formed on the end of the back-up arm extends across the slot 12 and lies under the section 31 of the yoke of the printer arm opposite the finger 38. The fingers 38 and 46 receive the downward force applied by tickets inserted into the slot 12 and the fingers also tie the two arms 28 and 42 together so that they always move together.

When a ticket is pushed down into the slot it pushes the fingers 38 and 46 down, carrying the printer and back-up arms 28 and 42 to the positions indicated by the dashed lines 28A and 42A. As the ticket moves down, the type face 22 presses against it to imprint the validation mark, while the back-up member 40 supports the ticket from behind. A portion of the printed carrying member behind the type face may be made of material such as "Porelon," made by the Johnson Wax Company, which is impregnated with ink so that it does not have to be re-inked after each printing, but holds sufficient ink for numerous printings. A more detailed description of the operation of the printing mechanism will be presented further on in this specification.

The back-up arm 42 carries a tab 48 for operating a counter 50 to count the number of validations made by the machine. A counter lever 52 is pivotally mounted at 54 on the side plates of the housing. A cam 56 formed on a first end of the counter lever is engaged by the tab 48 of the back-up arm, to cause the lever to pivot to the position 52A when the back-up arm moves down and the tab thereon moves to position 48A. As the lever 52 pivots, a tab 58 on the counter lever operates a counter arm 60 to advance 9 counter 62. The lever cam 56 is designed so that the lever 52 rotates by the greatest amount at the beginning of the downward movement of the back-up arm, thereby registering a count when only a small portion of the validation mark is imprinted. This prevents the obtaining of usable validations without registering them on the counter.

A set of bells 64 and 66 mounted on the base 18 provide a signal to indicate the operation of the apparatus. A long, closely wound coil spring, (commercially known as a Borden Cable), 68 is fixed at one end to the axle of the back-up arm 42. A bell striker 70 is fixed to the other end of the spring. When a ticket is validated and the back-up arm moves down and then up, the bell striker hits the bells 64 and 66 respectively. The back-up arm 42 is generally moved rapidly and stopped suddenly at its extreme up and down positions, thereby causing the spring 68 to overshoot its "at rest" up and down positions and cause the bells to be struck forcefully. If the back-up arm 42 is left in either the extreme up or down positions, the bell striker does not quite touch the bells, so that the striker does not stop the ringing after it strikes the bell. By reason of this operation, a spring is superior to a solid, unflexible rod.

The path taken by the printer carrying member 24 is shown in greater detail in FIGURES 4A and 4B. The flat type face 22 assumes a position substantially parallel to the slot 12 while the arms 28 and 42 are moving down, with the unloaded distance in absence of a ticket, if any, between the type face and back-up member being just sufficient to allow a thin cardboard ticket therebetween to be held in tight pressing engagement between the type face and back-up member. When the arms reach the bottom of their travel, the free end at 30 moves away from the ticket and back-up member. In the upward movement of the arms 28 and 42, the type face 22 is away from the ticket and cannot print again or smear the mark it has already made thereon.

The parts of the free end 31 of the printer carrying member is controlled by cams 32 and 33 fixed to the plates 20 and 22, respectively, which are engaged with pin 30 of the free end of the printer carrying member. As the printer arm 28 moves downwardly, the slotmost portion 72 of the cams keep the free end of the printer carrying member moving substantially parallel to the slot along a distance approximately equal to the length of the type face 22. The free end can be allowed to move toward or away from the slot, so long as the distance between those portions of the type face and back-up member in opposed engagement with the ticket are the required distance apart which assures firm pressing contact with the ticket.

When the pin 30 reaches the bottom 74 of the cams, it is free to move away from the ticket, and does so because of the force of the ticket and back-up member. When the ticket is pulled up the slot, and the arms 28 and 42 start to move up largely under the face of spring 36, the pin 30 moves in the slots 76 formed between the backward portion 78 of the cam 32 and the side plate 20, and between the backward portion 79 of cam 33 and closing member 80 on the plate 22 illustrated in FIGURE 5.

Thus, the type face 22 is held away from the ticket as the arms move up, and a double impression or smearing is eliminated.

When the arms 28 and 42 reach their uppermost position, the pin 30 has moved over the top of the cams 32 and 33. The pin is then ready to start down and eventually move along the slotmost portion 72 of the cams as a new ticket is pushed down. The closing member 80 is provided to prevent the pin 30 from moving back into the slots 76. The closing member 80 pivots about point 82, and is biased by spring 84 into a position shown by solid lines in FIGURE 5, wherein it closes the upper opening of the slot 76 and prevents the pin 30 from moving in the groove 76 on its way down. When the pin 30 moves up the slot 76, however, and starts to pass above the cam 33, the closing member 80 is pivoted to the position 80A to allow the pin to pass. The end portion 86 of the closing member has an upper surface which does not form a continuous line with the upper surface of the cam 33, but is higher than the upper surface of the cam. This holds the pin 30 up and prevents it from hitting the upper dividing point 88 on the cam 32 on its way down.

In another embodiment of the invention illustrated in the partial top view of FIGURE 6, a roller 90 is used as the back-up member for supporting a ticket as it is imprinted by the type face 22. The operation of this embodiment of the invention is illustrated by FIGURES 7A, 7B and 7C. As shown in the figures, the printing mechanism for this embodiment operates in a manner similar to that of the first described embodiment, except that the back-up member rolls instead of pivoting.

What is claimed is:

1. Ticket validating apparatus comprising:
a housing;
means defining a slot in said housing for receiving a ticket;
a printer-carrying member disposed on one side of said slot, having a type face thereon facing said slot;
a print back-up means disposed on a side of said slot opposite said printer carrying member;
forcing means for forcing substantially all of said print face against said back-up member with a ticket between them, as said ticket moves progressively into said slot;
said forcing means forcing said print face against said back-up means comprising first arm means pivotally mounted on said housing at a point on a first side of said slot;
said printer carrying member including a first side pivotally mounted on said first arm and a free second side; and including
cam means and follower means respectively mounted on said housing and on said printer carrying member, said cam means defining a path in combination with said second side of said printer carrying member, said path including a first portion lying adjacent to said slot and a second portion lying at least a predetermined distance from said slot; and
means for completely separating said print face from said ticket within said slot as said ticket is being retracted from said slot.

2. A ticket validating apparatus as defined in claim 1 wherein:
said first portion of said path of said free end as defined by said cam and follower means in combination with said printer carrying means is at least about as long as said print face, and said print face is substantially flat.

3. A ticket validating apparatus as defined in claim 1 including means for moving said printer carrying member generally along said slot; and wherein
said forcing means includes a cam follower means mounted on said printer carrying member and a cam fixed to said housing, said cam having a slotmost portion for holding said type face adjacent said slot as said ticket moves progressively into said slot, and said cam having a backward portion for allowing said type face to be generally held away from said slot as it moves back to its original position, obtaining prior to insertion of a ticket, as said ticket is withdrawn.

4. A ticket validating apparatus as defined in claim 3 including:
a closing member biased against said backward portion of said cam for closing said backward portion to said cam follower after the printing member has moved at least the majority of the distance toward its original position.

5. A validating apparatus comprising:
housing means defining a substantially straight slot;
a printer arm pivotally mounted on a first side of said slot;
a printer carrying member having a first end pivotally mounted on said printer arm and a free end;
a cam follower mounted on said free end of said printer carrying member;
a cam means disposed on said housing means and engaged with said follower, said cam means including a first portion which confine said free end to a path running substantially adjacent to said slot for imprinting on a ticket in said slot as said printer arm moves downwardly, and said cam including a second portion which holds said free end of said printer carrying member away from said slot as said printer arm moves back up as said ticket is withdrawn; and
back-up means disposed on a side of said slot opposite said printer arm for supporting said ticket as it is imprinted.

6. A validating apparatus as defined in claim 5 wherein;
said printer carrying member has a substantially flat type face thereon, and said path running substantially adjacent to said slot is substantially parallel with said slot.

References Cited

UNITED STATES PATENTS

| | | | |
|---|---|---|---|
| 1,005,782 | 10/1911 | Raber | 197—192 |
| 2,687,091 | 8/1954 | Miles | 101—279 XR |
| 2,711,692 | 6/1955 | Root | 101—297 |
| 2,775,196 | 12/1956 | Miles | 101—233 XR |
| 3,180,258 | 4/1965 | Ringholz | 101—235 |

ROBERT E. PULFREY, Primary Examiner

J. R. FISHER, Assistant Examiner